May 11, 1965  O. E. WILSON  3,182,645
INTERNAL COMBUSTION ENGINE
Filed July 24, 1963

INVENTOR
ORA E. WILSON
BY
ATTORNEY

United States Patent Office 3,182,645
Patented May 11, 1965

3,182,645
INTERNAL COMBUSTION ENGINE
Ora E. Wilson, Peggy Lane, Dixie Grove Trailer Park,
Tarpon Springs, Fla.
Filed July 24, 1963, Ser. No. 297,447
3 Claims. (Cl. 123—76)

The present invention relates to improvements in piston type internal combustion engines for effecting more complete combustion and to reduce or eliminate deleterious fumes resulting from operation of usual engines of the type mentioned.

A principal object of the invention is the provision of a piston type internal combustion engine having means to introduce air to the combustion chamber approximately at the time of ignition whereby a relatively rich mixture of fuel is ignited and then burned in a relatively lean or oxygen rich environment, thereby effecting complete combustion of the fuel.

Another object of the invention is the provision of an internal combustion engine of the type mentioned having a piston comprising two sections of different diameter and reciprocating in a cylinder of corresponding form, the smaller diameter section forming an end wall of a combustion chamber at the end of the cylinder, and the land between the smaller and larger diameter sections of the piston cooperating with a corresponding land of the cylinder to form an air compressor structure which directs air into the combustion chamber through valving mechanism timed to admit the air to the chamber at the time of ignition of the fuel.

Preferably, in a four cycle engine the air from the compressor structure is admitted in the form of a stream flowing transversely of the exhaust port of the combustion chamber, and the valving is effective to admit air to the combustion chamber during both the compression and the exhaust strokes of the piston so that the exhaust valve and the exhaust gas are cooled by the air, thereby reducing the operating temperature of the exhaust valve and reducing exhaust pressures.

A still further object of the invention is the provision of an internal combustion engine having a cylinder and piston formed to provide a combustion chamber at one end of the cylinder and an annular air compression chamber between the combustion chamber and the crankcase whereby gasses of combustion blowing by the piston from the combustion chamber are contained in the air compression chamber and are then returned to the combustion chamber and burned. This prevents the accumulation of unburned, smog producing gasses in the crankcase which in the usual engine escape through the breather pipe to atmosphere.

Figure 1:
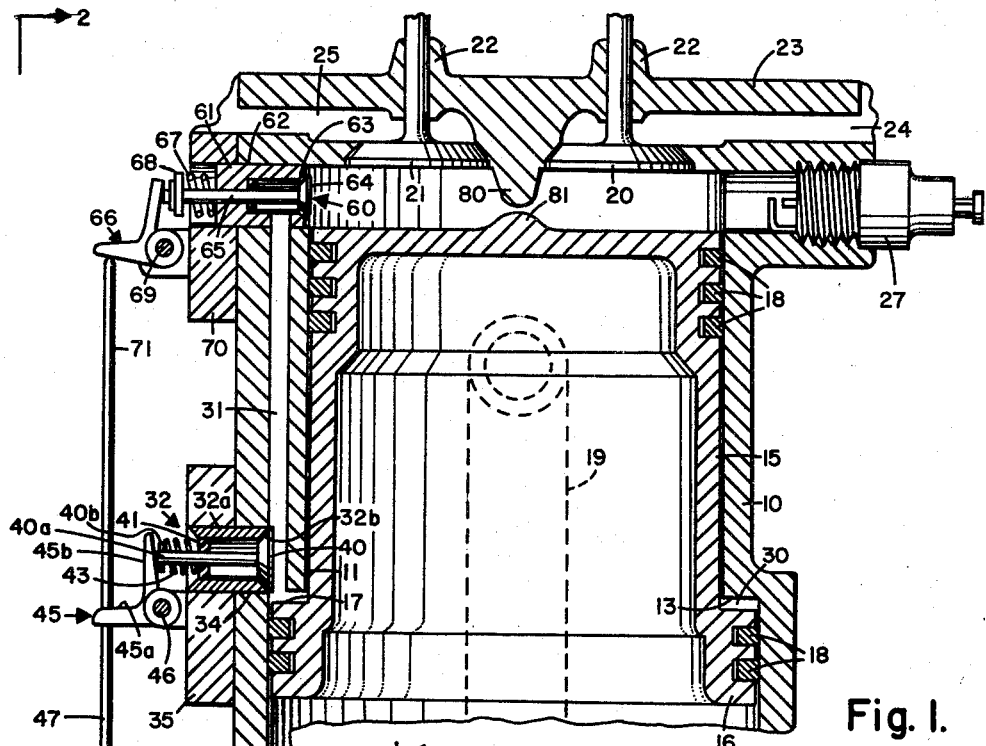
Figure 2:
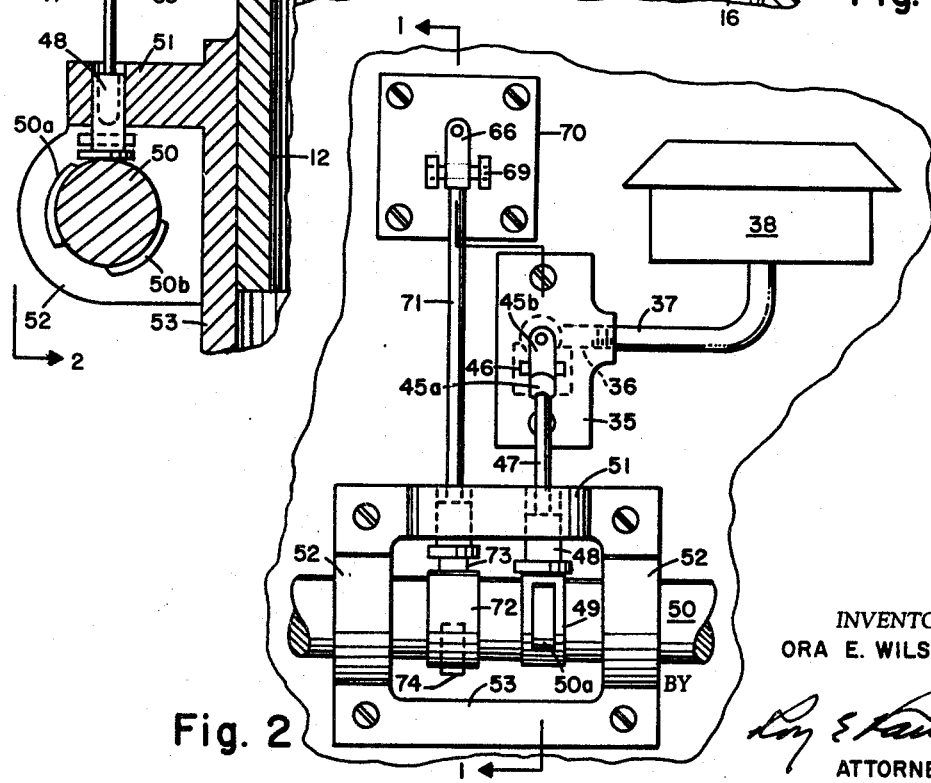

Other objects and advantages of the invention will be apparent from the following description of a preferred embodiment of the invention, reference being made to the accompanying drawing wherein:

FIG. 1 is a fragmentary sectional view of a cylinder and piston structure of a four cycle internal combustion engine taken along line 1—1 of FIG. 2, and FIG. 2 is a fragmentary elevational view of the engine taken substantially along line 2—2 of FIG. 1.

Referring to the drawing, the engine shown comprises a cylinder wall 10 which may be cooled in any suitable manner which is not important to this disclosure and therefore is not shown. The cylinder is formed in two sections, 11 and 12 respectively, having different diameters, section 12 having a somewhat larger diameter than that of section 11, and the two sections are interconnected by an annular wall 13. The lower end of section 12 opens into the crankcase which is not shown as it may be of conventional structure.

A piston 15 reciprocates in the cylinder and has a lower enlarged portion 16 which closely fits in cylinder section 12. An annular face 17, between the upper and lower portions of the piston, faces the annular wall section 13 of the cylinder so that when the piston moves downwardly from the position shown air may be drawn into the annular chamber formed between the piston face 17 and the enlarged section 12 of the cylinder and then compressed and expelled when the piston moves upwardly, as is explained more fully hereinafter.

The upper and lower portions of the piston are provided with conventional piston rings 18 to maintain compressions and to aid in lubrication of the cylinder walls. A connecting rod 19 interconnects the piston with the crankshaft of the engine, not shown, in the well known manner.

The upper end of the cylinder has intake and exhaust ports which are closed by valves 20 and 21 respectively, which include stems which are guided in bushings 22 located in a head wall 23 of the engine and which in part form the walls of a fuel intake passage 24 and an exhaust passage 25. Valves 20 and 21 are operated in timed relation to reciprocation of the piston in the usual manner employed with valve-in-head type engines to provide a fuel intake, compression, power and exhaust cycles in the cylinder as the engine crankshaft revolves twice. As is usual, a spark plug 27 is provided for igniting the fuel mixture for the power stroke and the plug is preferably located at one side of the combustion chamber adjacent to the intake valve 20.

The annular wall 13, piston face 17, and the sides of cylinder section 12 form a compression chamber 30 and an air passage 31 is provided which interconnects this chamber with the combustion chamber above piston 15. Air is drawn into chamber 30 through a valve 32 comprising a sleeve 32a in a transverse bore 34 through the cylinder wall and a valve bracket plate 35, the sleeve being press fitted in the bracket and slip fitted in the cylinder wall. Plate 35 has a passage 36 opening into the side of sleeve 32a and this passage has a pipe 37 threaded therein for conducting air from a suitable air filter 38 to the interior of the sleeve. The inner end of sleeve 32a forms a valve seat 32b which is closed by a poppet type valve 40. Valve 40 has a stem 40a which projects from the left hand end of sleeve 32a and which is guided by a suitable bushing 41 secured in the sleeve. This bushing may be of a low friction material such as tetrafluoroethylene resin, and a compression spring 43 surrounds the stem and engages bushing 41 and a head 40b on the stem to urge valve member 40 to seat 32b.

Valve 40 is moved from seat 32b by a mechanism comprising a rocker arm 45 pivoted to plate 35 by a pin 46 and one arm 45b is arranged to press against the end of stem 40a and the other arm 45a is engaged by a vertically extending push rod 47, the lower end of which has a cam follower 48 connected therewith which rides on section 49 of cam shaft 50 and is guided vertically by a bushing structure 51. Cam shaft 50 is journaled in bearings 52 formed on a plate 53 bolted to the side of the engine, and the cam shaft is driven by suitable gearing to rotate at one half the speed of the crankshaft. The cam drive structure may be of any conventional arrangement and for sake of clarity it is not shown. The section 49 of the cam shaft engaged by push rod 47 has two raised portions, 50a and 50b, which are positioned to cause opening of valve 40 during each downward movement of piston 15 so that air will be drawn into the annular compression chamber 30 during each such movement of the piston, and at the end of each downward stroke the valve closes so that air cannot escape therethrough during upward movement of the piston during which air will be compressed in chamber 30.

Air compressed in chamber 30 by upward movement of piston 15 is admitted to the combustion chamber through a valve mechanism 60 which comprises a bushing 61 securely fixed in a bore 62 through the side of the cylinder and intersecting passage 31. The inner end of the bushing has a valve seat 63 on which a poppet type valve member 64 seats, which valve member has a stem 65 slidingly supported in an opening through the bushing and projecting for engagement by a rocker arm 66. A compression spring 67 surrounds the outer portion of stem and is disposed between the bushing and a head 68 on the end of the stem for urging valve 60 to its seat closing position.

Rocker arm 66 is pivoted on a bearing pin 69 supported on spaced blocks formed on a bracket plate 70 bolted to the side of the engine and it is engaged by a push rod 71 and rocked clockwise to open valve 60. Push rod 71 is supported for vertical movement similarly to rod 47 and it engages cam shaft 50 at section 72 thereof which has two raised portions 73 and 74, which are on opposite sides of the cam shaft. Rise 73 is relatively short and is disposed on the cam shaft to cause a rapid opening and reclosing of valve 60 an instant before firing of plug 27 and the valve is again opened by rise 74 during the exhaust stroke of the piston so that air from chamber 30 is directed into the combustion chamber during the time exhaust valve 21 is open.

In operation, during the intake stroke of piston 15, a mixture of air and fuel is drawn into the cylinder through open valve 20 and this mixture is relatively rich, being of a ratio of about 12.5 to 1 of air to fuel. During this stroke of the piston, air is drawn into chamber 30 through valve 40, and at the end of the intake stroke, valves 20 and 40 close so that the fuel and air mixture in the combustion chamber is compressed by upward movement of the piston as is the air in chamber 30. The portion 16 of piston 15 and the cylinder section 12 in which it operates are designed so that the air is compressed to a pressure in excess of the pressure of the fuel mixture in the combustion chamber. Just prior to ignition and at the upper end of the piston stroke, valve 60 is opened to admit the air from chamber 30 and passage 31 into the combustion chamber, and at ignition the valve 60 is closed. Before the air introduced through valve 60 permeates to the area about spark plug 27, the rich fuel mixture in this area is ignited and the air introduced into the opposite side of the combustion chamber affords an oxygen enriched mixture for the burning fuel so that complete and even combustion occurs. After air is introduced through valve 60, the ratio of air to fuel will be about 14.6 to 1. It will be appreciated that the rich mixture at the spark plug assures easy ignition of the fuel and the added air assures complete combustion.

To retard mixing of the air with the rich fuel mixture about the spark plug 27 where air is introduced into the combustion chamber, a ridge 80 is formed depending from the top of the combustion chamber and extending transversely of the chamber and a corresponding ridge 81 is formed across the piston face so that these two ridges form a barrier or partition between the port of the valve 60 and the spark plug when the piston is in its upper position.

During the power stroke of the piston, valve 60 is closed and valve 40 is open, permitting air to be drawn into chamber 30. At the end of the power stroke, valve 40 closes and cam rise 74 opens valve 60 so that on the exhaust stroke of the piston, i.e.: its upward movement following the power stroke, air is directed into the combustion chamber and is diverted across the open exhaust valve 21, thereby tending to cool the valve and also furnishing oxygen for completely burning any unburned fuel remaining in the charge. Also any blow by gasses entering chamber 30 from the combustion chamber during the power stroke are discharged into the exhausting gasses and are consumed. When piston 15 reaches the top of its stroke, valve 21 closes and intake valve 20 opens to commence the intake cycle described hereinbefore.

It will be seen that I have provided an improved internal combustion engine of the piston type which provides ready ignition of a relatively rich fuel mixture and complete combustion for maximum power and efficiency. By arranging an air compression chamber below the piston proper, a supercharger mechanism is provided which is compact, reliable, and serves to return blow by gasses to the chamber for complete burning thereof.

It will be understood that although I have described but one form of the invention, other forms, modifications, and adaptations hereof could be made, all falling within the scope of the following claims.

I claim:
1. In an internal combustion engine:
   (a) a cylinder substantially closed at one end by an end wall,
   (b) a piston reciprocable in said cylinder in cycles comprising an intake stroke, compression stroke, power stroke and exhaust stroke,
   (c) means cooperating with said piston when said piston is toward said end wall of said cylinder for forming a barrier in said one end of said cylinder to provide substantially separate combustion and reserve air chambers between said piston and said end wall,
   (d) a fuel inlet valve means in said one end of said cylinder in the area encompassed by said combustion chamber and operable to admit a fuel mixture into said cylinder during said intake stroke of said piston,
   (e) exhaust valve means operable to divert spent gasses from said cylinder during said exhaust stroke of said piston,
   (f) ignition means in the area encompassed by said combustion chamber for igniting the fuel mixture in said cylinder when said piston is substantially at the end of said compression stroke,
   (g) said combustion chamber substantially enclosing therein said inlet valve means and said ignition means when said piston is at the end of said compression stroke,
   (h) means for introducing air into said reserve air chamber including an auxiliary valve in said one end of said cylinder and in the area encompassed by said reserve air chamber, and
   (i) means operable to open said auxiliary valve means when said piston is toward the end of its compression stroke and to close said auxiliary valve during said intake and power strokes.

2. An internal combustion engine as defined in claim 1 in which said means recited in (c) includes a ridge-like structure extending from said end wall of said cylinder toward said piston and a ridge-like structure projecting from the end of said piston facing said end wall of said cylinder and lying in a common plane with the first mentioned ridge-like structure.

3. An internal combustion engine as defined in claim 1 characterized by said exhaust valve means being disposed in the area encompassed by said reserve air chamber.

References Cited by the Examiner

UNITED STATES PATENTS

| 1,012,652 | 12/11 | Kessler | 123—76 |
|---|---|---|---|
| 1,106,194 | 8/14 | Dunham | 123—76 |
| 1,146,864 | 7/15 | Gibson | 123—76 |
| 1,711,852 | 5/29 | Langdon | 123—75 |
| 2,011,986 | 8/35 | Schwarz | 123—26 |
| 2,082,078 | 1/37 | Ottoson | 123—75 |
| 2,179,143 | 11/39 | Brown | 123—75 |
| 2,306,217 | 12/42 | Leser | 123—75 |
| 2,692,591 | 10/54 | Tatter | 123—191 |

FOREIGN PATENTS 13,555  6/06  Great Britain.

FRED E. ENGELTHALER, *Primary Examiner.*